United States Patent
Fledersbacher et al.

(10) Patent No.: US 7,438,529 B2
(45) Date of Patent: Oct. 21, 2008

(54) COMPRESSOR AND TURBINE WHEEL FOR A SECONDARY AIR FEED DEVICE

(75) Inventors: Peter Fledersbacher, Stuttgart (DE); Hans-Georg Lehmann, Esslingen (DE); Martin Schlegl, Rudersberg (DE); Holger Stark, Allmersbach (DE)

(73) Assignee: Daimler AG, Stuttgart (DE)

( * ) Notice: Subject to any disclaimer, the term of this patent is extended or adjusted under 35 U.S.C. 154(b) by 404 days.

(21) Appl. No.: 11/399,686

(22) Filed: Apr. 6, 2006

(65) Prior Publication Data

US 2006/0222503 A1    Oct. 5, 2006

Related U.S. Application Data

(63) Continuation-in-part of application No. PCT/EP2004/009998, filed on Sep. 8, 2004.

(30) Foreign Application Priority Data

Oct. 10, 2003    (DE) ................ 103 47 842

(51) Int. Cl.
   F01D 5/14   (2006.01)
   F01D 15/08  (2006.01)
   F01N 3/32   (2006.01)
   F04D 25/04  (2006.01)

(52) U.S. Cl. ................... 416/175; 416/241 A

(58) Field of Classification Search ........... 416/175, 416/198 R, 198 A, 203, 213 R, 229 R, 229 A, 416/241 A
See application file for complete search history.

(56) References Cited

U.S. PATENT DOCUMENTS

| | | | |
|---|---|---|---|
| 1,959,703 A | 5/1934 | Birmann | |
| 2,924,937 A * | 2/1960 | Leibach | 60/804 |
| 2,975,959 A | 3/1961 | Foster | |
| 3,299,629 A | 1/1967 | Bouchard | |
| 4,260,339 A * | 4/1981 | Lofts | 417/406 |
| 6,062,028 A * | 5/2000 | Arnold et al. | 60/612 |
| 6,082,975 A | 7/2000 | Lahens | |
| 6,334,436 B1 | 1/2002 | Paffrath et al. | |
| 6,502,398 B2 * | 1/2003 | Kapich | 60/608 |

FOREIGN PATENT DOCUMENTS

| | | |
|---|---|---|
| DE | 196 30 792 | 10/1997 |
| DE | 196 41 467 | 4/1998 |
| DE | 200 09 004 | 9/2000 |
| DE | 199 37 781 | 2/2001 |
| EP | 1 154 133 | 11/2001 |
| FR | 2 411 300 | 7/1979 |
| GB | 740 682 | 11/1955 |
| GB | 1 021 303 | 3/1966 |
| JP | 04 112957 | 4/1992 |
| WO | WO 90/03506 | 4/1990 |

* cited by examiner

*Primary Examiner*—Edward Look
*Assistant Examiner*—Nathaniel Wiehe
(74) *Attorney, Agent, or Firm*—Klaus J. Bach

(57) ABSTRACT

In a compressor and turbine wheel for a secondary air feed device formed as a single component, a rotor which includes a center disc structure consisting of at least two discs of different materials is provided at one side with compressor blades and on the opposite side with turbine blades, and the discs consist of an alloy based on Al, Mg, Ti, Fe, or Ni and are preferably arranged in axially spaced relationship with a disc carrier of a plastic material disposed in the space between the two bladed discs.

11 Claims, 5 Drawing Sheets

US 7,438,529 B2

COMPRESSOR AND TURBINE WHEEL FOR A SECONDARY AIR FEED DEVICE

This is a Continuation-In-Part Application of International Application PCT/EP2004/009998 filed Sep. 8, 2004 and claiming the priority of German Application 103 47 842.6 filed Oct. 10, 2003.

BACKGROUND OF THE INVENTION

The invention is relates to a compressor and turbine wheel for a secondary air feed device wherein the compressor and turbine wheel are in the form of a single component.

A secondary air feed device for an internal combustion engine, which has a compressor driven by a turbine via a shaft in order to allow additional air to be introduced onto the exhaust-gas side of the internal combustion engine by means of the compressor, in particular in the starting phase of the internal combustion engine, is already known (DE 199 37 781 A1). The addition of air to the exhaust gas leads to oxidation of the hydrocarbons and carbon monoxides remaining in the exhaust gas and consequently to a reduction of the exhaust emissions from the internal combustion engine. The compressor is driven via the turbine, which is for its part driven by the pressure difference in the induction section compared to the environment, which is caused by the throttle valve. The compressor and the turbine each have a bladed rotor, each being secured to a shaft of the secondary air feed device.

SUMMARY OF THE INVENTION

In a compressor and turbine wheel for a secondary air feed device formed as a single component, a rotor which includes a center disc structure consisting of at least two discs of different materials is provided at one side with compressor blades and on the opposite side with turbine blades, and the discs consist of an alloy based on Al, Mg, Ti, Fe, or Ni and are preferably arranged in axially spaced relationship with a disc carrier of a plastic material disposed in the space between the two bladed discs.

The compressor and turbine wheel according to the invention has the advantage of a simple, inexpensive design which, moreover, allows simplified wheel mounting. The reduction in weight which can be achieved is particularly advantageous, so that the secondary air feed device has a very low total weight and the rotor has a low mass, which also leads to improved dynamics and a fast response of the combined compressor and turbine wheel. Furthermore, in addition to wheel mounting, balancing of the combined compressor and turbine wheel is also simplified.

Furthermore sealing of the bladed compressor and turbine wheel with respect to the housing is simplified, so that gap leakages can be considerably reduced.

Exemplary embodiments of the invention are illustrated in simplified form in the drawings and explained in more detail in the following description on the basis of the accompanying drawings:

DESCRIPTION OF THE EXEMPLARY EMBODIMENTS

Figure 1:
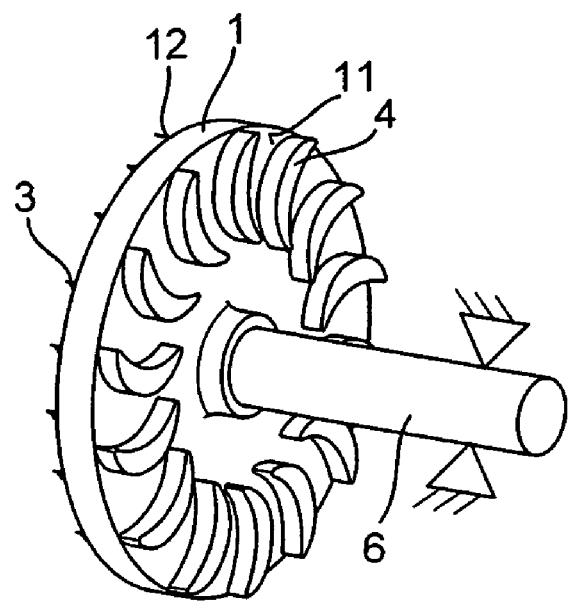
FIG. 1 is a perspective view of a first exemplary embodiment of the invention showing a rotor of a combined compressor and turbine wheel wherein the turbine side is visible.
Figure 2:
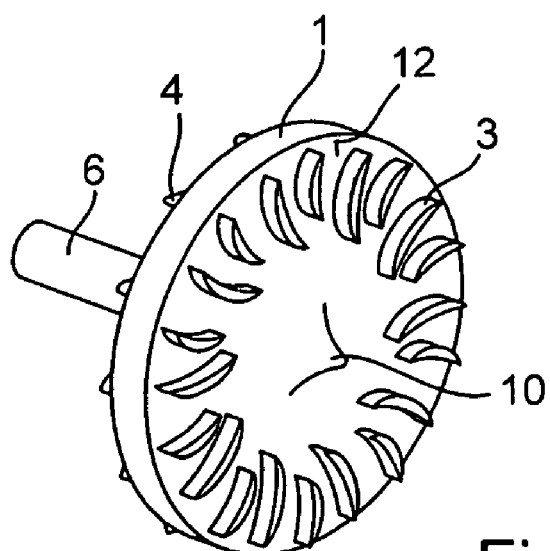
FIG. 2 is a perspective view of the compressor side of the rotor of the combined compressor and turbine wheel.

FIG. 1 is a perspective view of an integral rotor 1 according to the invention for a secondary air feed device, which has compressor blades 3, turbine blades 4 and a shaft 6. The rotor 1 and shaft 6 are connected fixedly in terms of rotation, for example by the rotor 1 being shrink-fitted onto the shaft 6. The rotor 1 has a cylindrical carrier disc which supports the turbine blades 4 on the side facing the shaft 6 and the compressor blades 3 on the side facing away from the shaft 6. As shown in more detail in FIG. 2, the end of the shaft 6 is dome-shaped on the side 12 of the compressor blades 3. Designing the shaft end as a dome 10 results in optimized introduction of air into the compressor, which air flows radially outwardly along the compressor side of the rotor. The incoming flow onto the turbine blades 4 is oppositely directed, from the radially outer end toward the radially inner end that is toward the shaft 6.

The turbine blades 4, as well as the compressor blades 3, have for example an airfoil profile in a cross sectional plane. In place of the flat, two-dimensional form of blade structures illustrated, it is also possible to provide a conventional, spatial, three-dimensional form of the blades, as is also customary in exhaust-gas turbochargers. In this respect, reference is made, for example, to DE 100 50 161 A1.

The turbine blades 4 project axially from a side face 11 of the rotor 1. In the same way, the compressor blades 3 project axially in a direction opposite to that of the turbine blades 4, from the opposite side face 12 of the rotor 1. The airfoil profiles of the turbine blades 4 are of a greater width than the airfoil profiles of the compressor blades 3 and are therefore thicker and more curved. The turbine blades 4, which are curved in a hook shape, are distributed uniformly over the circumference of the rotor 1 and have their longest extent oriented approximately in the radial direction toward the shaft 6. By contrast, the compressor blades 3 have an elongate, narrow, arcuate shape, with a longer blade in each case following a shorter blade. The compressor blades 3 are likewise oriented with their longest extent generally radially with respect to the shaft 6.

Figure 3:
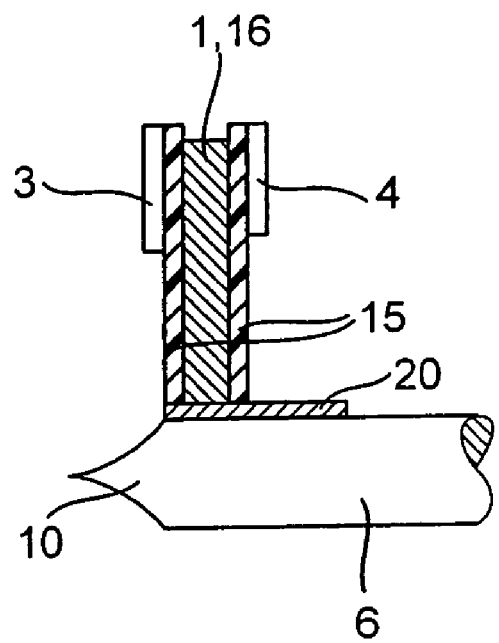
FIG. 3 is a sectional illustration of the rotor mounted on a shaft in accordance with a particular embodiment of the invention.

According to a first exemplary embodiment the rotor 1 with compressor blades 3 and turbine blades 4 is in the form of a single piece. Suitable production processes for providing this embodiment include: injection molding [plastics, for example PEEK (polyether ether ketone, a further development of polyether sulfones), PA (polyamide), PPS (polyphenylene sulfide), PFA (perfluoroalkoxy copolymer) or alloys based on Al (aluminum) or Mg (magnesium)], precision casting (alloys based on Al or Mg), high-pressure die casting (alloys based on Al or Mg) or milling, in which case a wide range of machineable and lightweight materials are suitable. In addition to the single-part design of the rotor 1 described, a hybrid construction of the integral rotor 1 produced by combining at least two assemblies made from identical or different materials is also possible. Metal alloys based on Al, Mg, Ti (titanium), Fe (iron), Ni (nickel) in the form of metal sheets, foils or castings or also in combination with plastics, for example PEEK, PA (polyamide), PFA (perfluoro(alkoxy alkane)) and/or foams, such as for example PU (polyurethane), may be suitable for this purpose. The plastics may optionally be provided with additional fiber reinforcement, for example comprising glass fibers (40%). An example of a rotor 1 of this type can be seen in FIG. 3, which shows a section through the rotor 1 with compressor blades 3 and turbine blades 4, together with shaft 6. The rotor 1 has two blade discs 15, which may consist, for example, of a metal sheet or of a steel or aluminum alloy. Suitable manufacturing processes for structuring the blade discs 15 include stamping, deep-drawing or electrochemical etching.

The space between the two blade dics 15 is filled with plastic by injection molding or foaming, and this plastic forms the blade carrier 16. The result is a non-releasable composite comprising the compressor blades, the blade dics 15 and the blade disc carrier 16. The rotor 1 is attached to the shaft 6 via a sleeve 20 which is, for example, metallic.

If the blade disc carrier 16 should prove not to have a sufficient creep resistance, for example because it is made from a foamed or solid plastic, it may be necessary for the blade disc carrier 16 to be reinforced with a metallic sleeve 20 in the region of its transition between rotor 1 and shaft 6. The sleeve 20 may either be designed as a separate component or it may be an integral part of at least one blade disc 15. It is preferable for the rotor 1 to be supported on only one side. At its end, the shaft 6 is supported both axially and radially in a bearing, which is not illustrated but which is preferably a ball bearing. The combined turbine/compressor rotor 1 is located at the other end of the shaft 6. Since the air path in the compressor is more critical than the flow of air out of the turbine, the compressor is provided on the side of the rotor 1 remote from the ball bearing. Supporting the rotor 1 at only one side is only possible if the forces acting on the bearing remain at a relatively low level. The cantilevered length of the shaft should therefore be kept short. The compact design of the rotor 1 according to the invention permits a cantilevered support of the rotor 1 in this way, especially since it can be made from lightweight materials.

Figure 4:
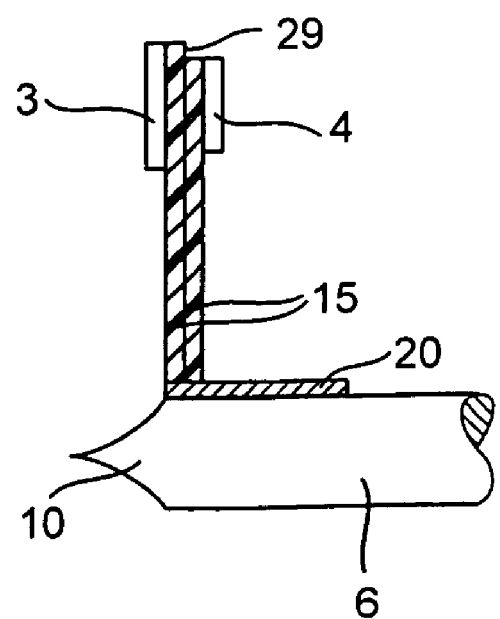
FIG. 4 is a sectional illustration of the rotor mounted on a shaft in accordance with an exemplary embodiment of the invention.

FIG. 4 shows a third exemplary embodiment of the rotor 1 in section, in which the blade discs 15 are directly connected to one another, with the result that there is no need for an independent blade carrier. To connect the two blade discs 15, they can be adhesively bonded to one another or thermally joined, for example by welding or soldering. The two stamped discs 15 may also be produced from the same material. A further connection to the sleeve 20 may also be required.

Figure 5:
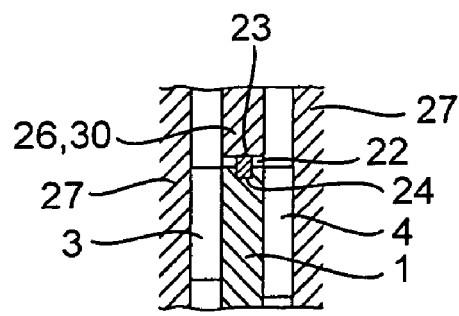
FIG. 5 is a sectional illustration of an end region of the rotor disposed in a housing and sealed in the housing by means of a seal ring.

In accordance with the invention the turbine and compressor wheel are combined so as to form a single, integral component 1. This requires the air spaces between the turbine side and the compressor side to be effectively sealed with respect to one another. Although a low level of leakage can be tolerated, this still would have an unfavorable influence on the overall efficiency of the secondary air feed device. The text which follows provides a more detailed explanation of various sealing concepts. The seal is provided in the circumferential region between compressor and turbine side. FIG. 5 shows a first variant of the seal structure, according to which the rotor 1, at its radial circumference 22, has an annular seal ring 23 which is accommodated in a groove 24 in the radial circumference 22 of the rotor 1. It is also conceivable for the groove 24 to be provided in a radial web region 30 of the housing 26 of the secondary air feed device. The compressor blades 3, like the turbine blades 4, are surrounded on both sides by housing sections 27 of the secondary air feed device.

Figure 6:
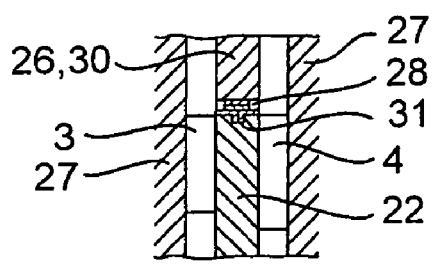
FIG. 6 is a sectional illustration of an end region of the rotor which is sealed in the housing by means of a brush-type seal.

FIG. 6 shows another seal variant, in which a radially encircling brush seal 28 is provided. The brush seal 28 is accommodated in the radial web region 30 of the housing 26 of the secondary air feed device, and its brushes 28 act on a radial groove 31 provided at the radial circumference 22 of the rotor 1.

Figure 7:
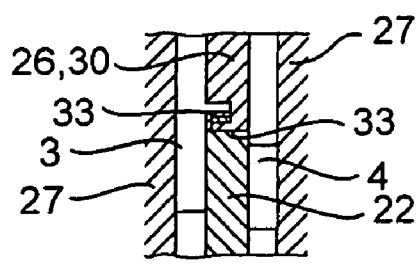
FIG. 7 is a sectional illustration of the rotor, which is sealed in the housing by means of a labyrinth seal.
Figure 8:
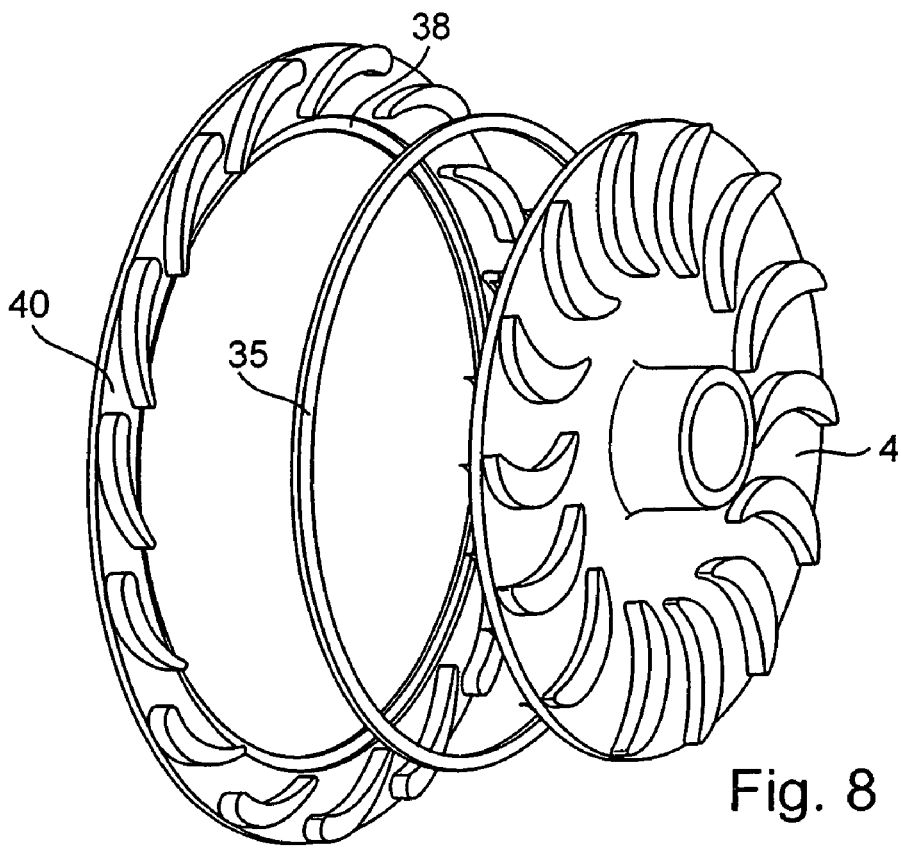
FIG. 8 is a perspective view of the rotor, a radially encircling sealing ring and a guide vane structure in which the sealing ring is accommodated in the assembled state, showing the turbine side.
Figure 9:
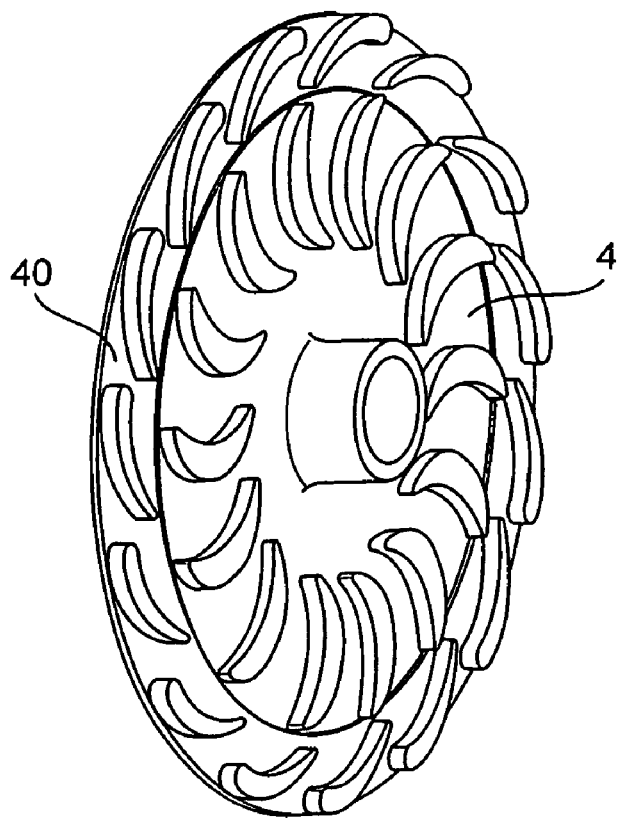
FIG. 9 is a perspective view of the rotor shown in FIG. 8 in the assembled state, also showing the turbine side.
Figure 10:
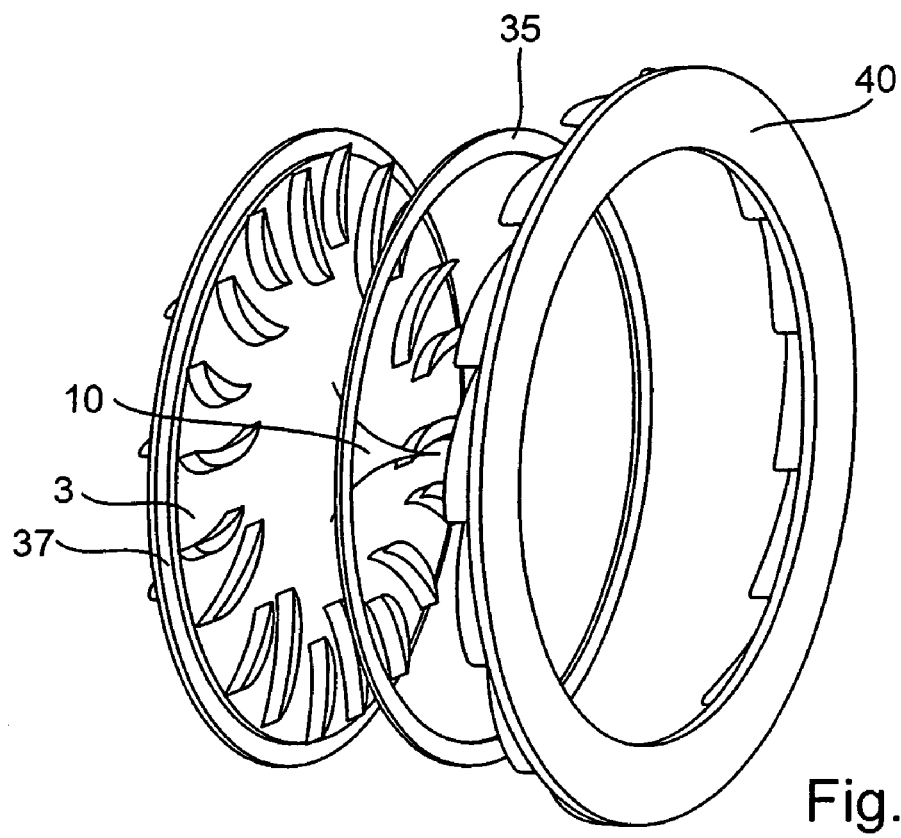
FIG. 10 is a perspective view of the rotor as shown in FIG. 8 showing the compressor side.
Figure 11:
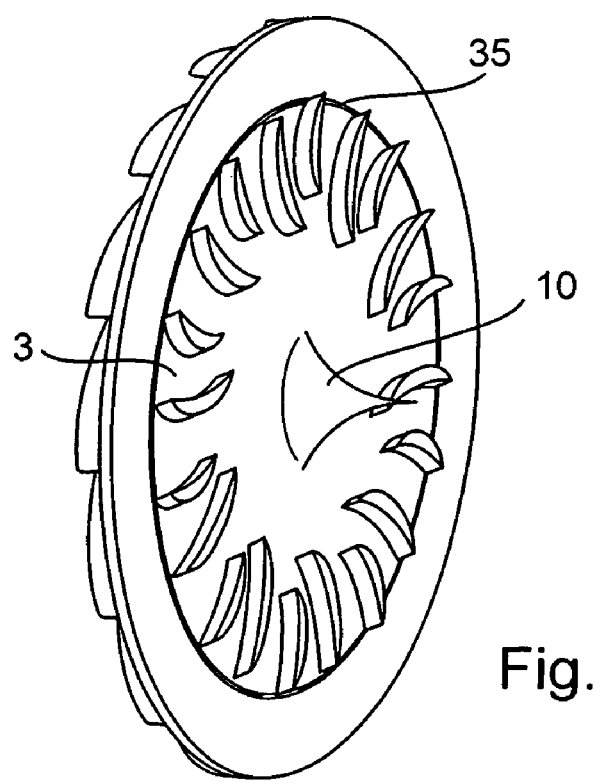
FIG. 11 is a perspective view of the rotor shown in FIG. 8 in the assembled state showing the compressor side.

FIG. 7 shows a further sealing variant, in which a radially encircling labyrinth seal is provided for the purpose of sealing off the rotor 1 in the housing 26. As can be seen from FIG. 7, a labyrinth-like groove profile 33, which surrounds an end region 22 of the rotor 1 having the compressor blades 3, is provided in the radial web region 30 of the housing 26 of the secondary air feed device. However, it is also conceivable for the turbine blades 4 to be sealed off with respect to the housing by means of a labyrinth seal.

As shown in more detail in FIGS. 8 to 11, slide or seal rings 35 for sealing purposes, which may include low-friction linings are arranged on the radially inner and/or outer and/or on the side surfaces of the slide rings or the surfaces of the housing or rotor in contact with the seal rings. The slide or seal rings 35 surrounding the rotor 1 are accommodated in a corresponding receiving groove 37 on the rotor 1 and, in a corresponding way, in a receiving groove 38 in the housing or in a guide cascade 40 which radially surrounds the rotor 1. The lining may also be a grind-in lining adapted to generate a seal with minimal or no clearance.

As shown in more detail in FIGS. 8 to 11, the slide ring 35 is accommodated between the rotor 1 and the stationary guide vane structure 40. The slide ring 35 provides a seal with respect to the stationary guide vane structure 40 and therefore with respect to the housing. A guide vane structure 40 can be provided in order to further improve the incoming flow onto the turbine blades 4. The guide vane structure 40 is in turn accommodated in the adjoining housing 26 (not illustrated in more detail) of the secondary air feed device. A sealing surface 29 for the slide ring 35 is also provided on the rotor 1 in FIG. 4, for example radially above the turbine blades 4.

Instead of the compressor blades and turbine blades as illustrated in the form of an airfoil profile of constant height disposed on a flat disc (quasi-two-dimensional), it is also possible to employ a conventional, three-dimensional, spatial blade arrangement. In all variants of the blades, whether areal or spatial, the blades are non-releasably connected to the blade carrier 16.

What is claimed is:

1. A compressor and turbine wheel for a secondary air feed device, comprising a single common component (1) which forms a combined compressor wheel and turbine wheel, the common component being designed in the form of a rotor (1) which carries compressor blades (3) on one side (12) and turbine blades (4) on an opposite side (11) of the rotor, the rotor (1) consisting of at least two materials, a metallic material and a plastic, wherein the metallic material is an alloy based on at least one of Al, Mg, Ti, Fe, Ni, in the form of one of a metal sheet, foil or casting, and the plastic is one of PEEK, PA, PFA, PPS and foams of plastic materials, and wherein the rotor (1) comprises two spaced blade discs (15) with a blade disc carrier (16) of a plastic material being disposed in the space between the two blade discs (15).

2. The compressor and turbine wheel as claimed in claim 1, wherein a sleeve (20) for attachment of the rotor to the shaft (6) is provided and connected to the rotor (1).

3. The compressor and turbine wheel as claimed in claim 1, wherein a seal (23; 28; 33; 35) is provided between a housing (26) of the secondary air feed device and the rotor (1).

4. The compressor and turbine wheel as claimed in claim 3, wherein the seal is a ring seal (23).

5. The compressor and turbine wheel as claimed in claim 3, wherein the seal is a brush seal (28).

6. The compressor and turbine wheel as claimed in claim 3, wherein the seal is a labyrinth seal (33).

7. The compressor and turbine wheel as claimed in claim 3, wherein the seal is provided with a grind-in lining (35) which is formed between the rotor (1) and a stationary guide cascade ring (40).

8. The compressor and turbine wheel as claimed in claim 1, wherein the rotor (1) is accommodated in a housing (26) of the secondary air feed device, supported on one side of the rotor (1).

9. The compressor and turbine wheel as claimed in claim 1, wherein for the rotationally fixed connection of rotor (1) and shaft (6), the rotor (1) is shrink-fitted onto the shaft (6).

10. The compressor and turbine wheel as claimed in claim 1, wherein the blades of the compressor (3) and of the turbine (4) have airfoil profiles.

11. The compressor and turbine wheel as claimed in claim 1, wherein the blade carrier (16) is formed from plastic injected between the blade discs (15) by one of injection molding and foaming.

* * * * *